United States Patent [19]

Wachter

[11] Patent Number: 4,714,583
[45] Date of Patent: Dec. 22, 1987

[54] METHOD AND APPARATUS FOR COMPACTING SPENT NUCLEAR REACTOR FUEL RODS

[75] Inventor: William J. Wachter, Wexford, Pa.

[73] Assignee: U.S. Tool & Die, Inc., Allison Park, Pa.

[21] Appl. No.: 814,481

[22] Filed: Dec. 30, 1985

Related U.S. Application Data

[63] Continuation-in-part of Ser. No. 291,230, Aug. 10, 1981.

[51] Int. Cl.⁴ .................................... G21C 19/32
[52] U.S. Cl. ........................... 376/261; 376/272; 29/723; 414/146; 294/906; 294/87.24; 294/119.3
[58] Field of Search ............... 376/261, 260, 272, 271; 294/87.1, 87.24, 87.22, 119.3, 103.1, 63.2, 906; 414/146, 746; 29/400 N, 723, 426.2, 426.3

[56] References Cited

U.S. PATENT DOCUMENTS

| | | | |
|---|---|---|---|
| 2,355,004 | 8/1944 | McCulloch | 294/87.24 |
| 2,626,830 | 1/1953 | Glazer | 294/87.24 |
| 2,695,190 | 11/1954 | Meierjohan | 294/119.3 |
| 2,968,907 | 1/1961 | Bernheim et al. | 294/119.3 |
| 3,014,752 | 12/1961 | Reifers | 294/119.3 |
| 3,071,403 | 1/1963 | Preu et al. | 294/119.3 |
| 3,174,791 | 3/1965 | Dardaine | 294/87.24 |
| 3,262,595 | 7/1966 | Seip, Jr. et al. | 294/87.1 |
| 3,347,587 | 10/1967 | Frost | 294/119.3 |
| 3,438,515 | 4/1969 | Nowicki | 294/87.1 |
| 3,760,966 | 9/1973 | Jones, Jr. et al. | 294/87.1 |
| 3,881,762 | 5/1975 | Zappia | 294/119.3 |
| 3,904,048 | 9/1975 | Van Santen et al. | 376/271 |
| 3,992,255 | 11/1976 | De Wesse | 376/228 |
| 4,119,217 | 10/1978 | Jones | 294/63.2 |
| 4,363,593 | 12/1982 | Eberle | 294/119.3 |
| 4,374,801 | 2/1983 | Albin | 376/271 |
| 4,441,242 | 4/1984 | Hicken et al. | 376/272 |
| 4,474,727 | 10/1984 | Kmonk et al. | 376/272 |
| 4,547,117 | 10/1985 | Shields et al. | 376/272 |
| 4,551,299 | 11/1985 | Shields | 376/261 |

FOREIGN PATENT DOCUMENTS 3222822 12/1983 Fed. Rep. of Germany ...... 376/272

Primary Examiner—Deborah L. Kyle
Assistant Examiner—Daniel Wasil
Attorney, Agent, or Firm—Clifford A. Poff; Thomas H. Murray

[57] ABSTRACT

A method and apparatus for withdrawing spent fuel rods from a nuclear fuel rod assembly into a different nuclear fuel rod container wherein the spent fuel rods have a higher fuel rod density, whereby a greater number of spent fuel rods can be stored in a water-storage pool. The individual rods are moved from a fuel assembly and through a transition funnel by movable grippers at opposite ends of the funnel. One movable gripper reciprocates between gripping and release positions in a gap between the fuel assembly and the transition funnel. A stationary gripper can be located in the gap at the entry side of the funnel to hold the fuel rods while the movable gripper returns from a release position to the gripping position. Both grippers include members which can be pressed into frictional engagement with the spaced apart array of fuel rods. All of the fuel rods are withdrawn concurrently and are merged toward one another into a tighter array within the transition funnel and emerge as a bundle. A movable and a stationary bundle gripper are provided between the funnel and the storage container to advance the bundle of fuel rods into the container.

18 Claims, 22 Drawing Figures

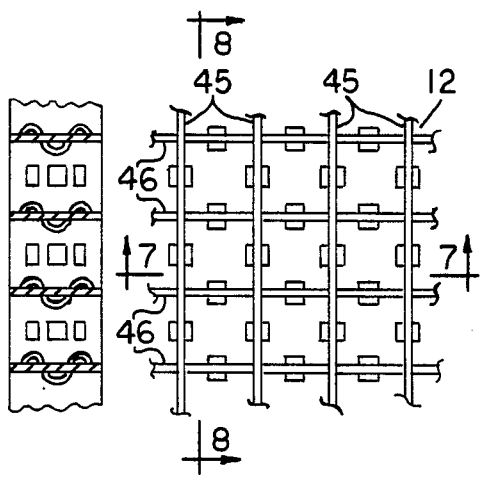
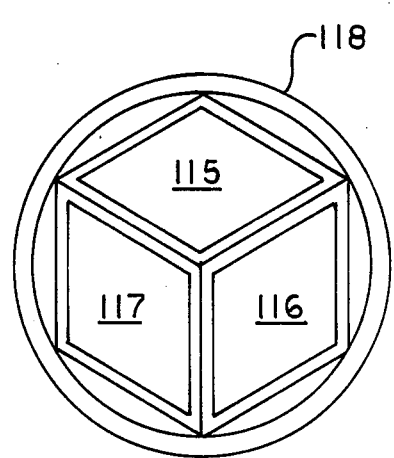
FIG. 8    FIG. 6    FIG. 22
FIG. 7
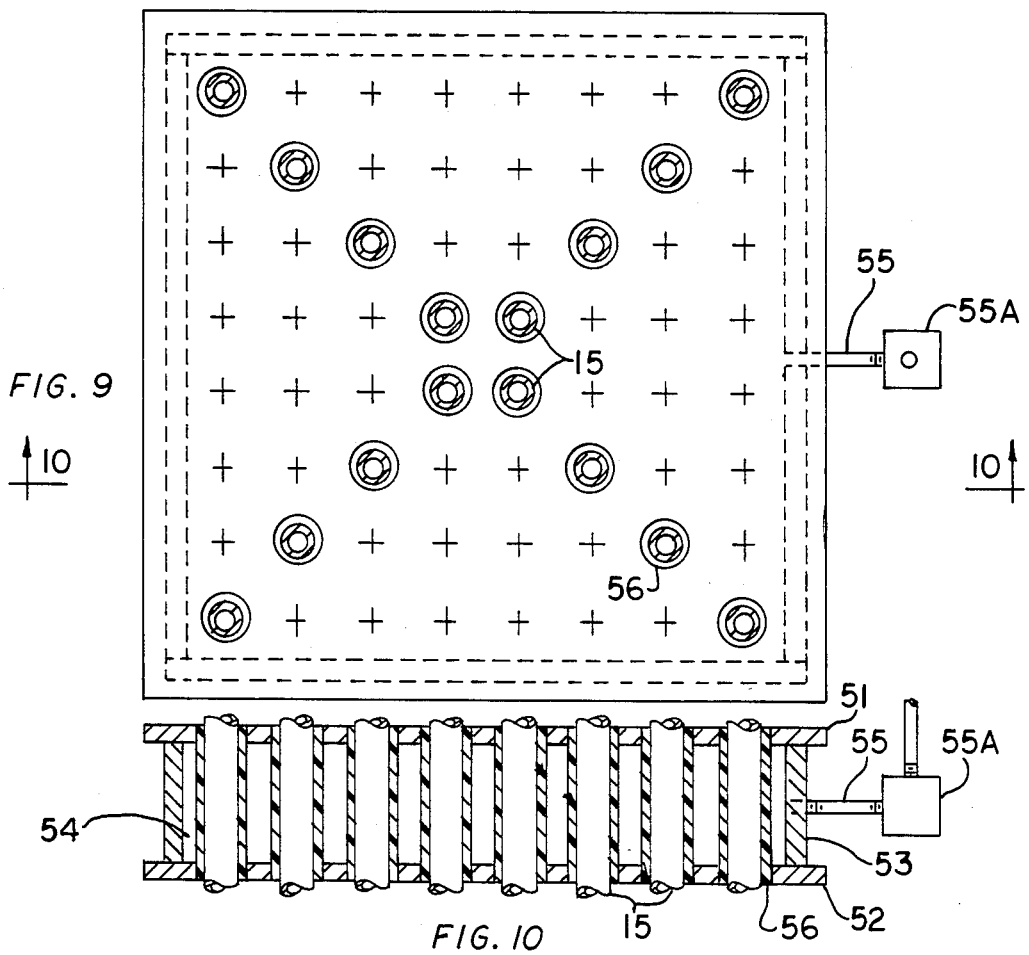
FIG. 9
FIG. 10

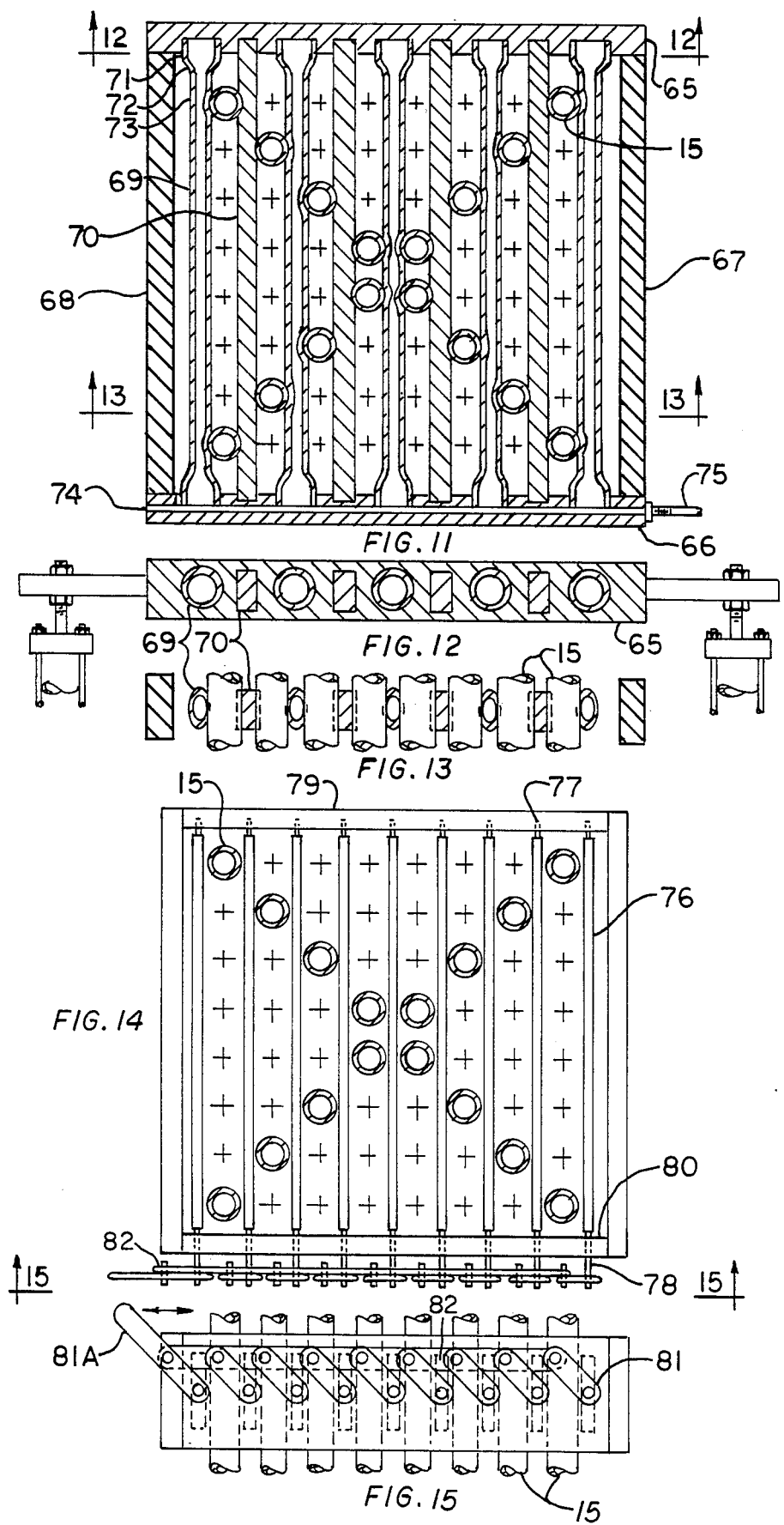

METHOD AND APPARATUS FOR COMPACTING SPENT NUCLEAR REACTOR FUEL RODS

CROSS-REFERENCE TO RELATED APPLICATION

This application is a continuation-in-part of application Ser. No. 291,230, filed Aug. 10, 1981.

FIELD OF THE INVENTION

This invention relates to a method and apparatus for compacting spent nuclear reactor fuel rods, and more particularly for preparing such spent fuel rods for long-term water pool storage.

STATEMENT OF THE PRIOR ART

Nuclear reactor installations employ nuclear fuel materials in the form of fuel rods which are supported in fuel rod assemblies. The fuel rods are metal pipes which are filled with nuclear fuel material and are about 0.4–0.6 inch in diameter and from 8 to 15 feet in length. Groups of 64, 128, 220 or more such fuel rods are assembled in a fuel rod assembly which includes grids for alignment and support of the fuel rods, a lower end fitting, an upper end fitting, and guide tubes. The fuel rod assembly is introduced into a nuclear reactor as the fuel source. After the nuclear fuel in the fuel rod assembly is spent to a pre-established level, the entire fuel rod assembly is withdrawn from the nuclear reactor and stored vertically in appropriate metal racks in a wet pool until the radioactive properties have dissipated sufficiently for transfer to other storage locations.

Within the fuel rod assembly, the individual fuel rods are spaced apart in a pre-established array, usually a rectangular array. The fuel rod assemblies are spaced apart in the array and are maintained under water in the reactor for the purpose of moderating or slowing the neutrons. In the fuel rod assembly, the ratio of cross-sectional area of fuel rod to cross-sectional area of water is approximately 1:1.

At the present time, spent nuclear fuel rod assemblies are withdrawn from the nuclear reactors and are stored vertically in appropriate storage racks under water in storage pools without any deliberate change in the fuel rod assembly. The fuel rod storage pools are filled with the spent fuel rod assemblies whose activity has dissipated as a result of extended storage in the pool.

A number of suggestions have been made for removing long-term storage fuel rod assemblies from the pool and for withdrawing individual spent fuel rods from the fuel rod assembly and thereafter for assembling the individual spent fuel rods in new containers or canisters wherein the fuel rods are more closely aligned, i.e., more densely compacted, and for returning such newly-filled canisters to appropriate storage racks within a water storage pool for long-term storage or until appropriate fuel recovery processing is economically feasible.

Some of the anticipated difficulties with the proposed fuel rod compacting processes which have been suggested arise from the knowledge that the actual fuel rods are twisted and bent out of alignment as a result of their long-term exposure in nuclear reactors. In some cases, the distortion may be as much as 5 inches in an 8-foot long rod. Such permanent distortion of the fuel rods will interfere with the proposed alignment techniques. The casing of the fuel rods should be handled by using procedures and equipment designed to accommodate embrittlement due to irradiation in the nuclear reactor.

A further problem is that the long, thin fuel rods are whippy and therefore likely to impact with each other when pulled from the fuel assembly. Such impacting could cause fuel rod breakage. Moreover, the fuel rods may be difficult to manipulate. A still further problem relates to the inherent safety of compacting spent fuel rods. There is a possibility that the fuel rods might become spaced apart by a critical distance while removed from the fuel rod assembly and before compaction and confinement in a storage canister. Moreover, the fuel rods might be dropped in the water pool or broken due to embrittlement during multimanipulation before confinement in a storage container. Such possibilities should be precluded.

SUMMARY OF THE INVENTION

According to the present invention, a method and related apparatus are provided for transferring spent fuel rods from a fuel rod assembly in an underwater pool or in a hot cell directly into a fuel rod canister where the density of the fuel rods greatly exceeds the fuel rod density in the fuel rod assembly. As a result of the present invention, the spent fuel storage capacity in a particular water storage pool can be approximately doubled. Moreover, the fuel rod consolidation process of the present invention is carried out without altering the relative position of the fuel rods whereby after consolidation, the identity of a fuel rod is known at each position in the fuel rod canister which facilitates accounting procedures.

According to the invention, an end of a fuel rod assembly is removed by cutting or otherwise and grippers of a movable gripper assembly are passed between rows of the exposed end portions of the array of fuel rods to simultaneously grip the fuel rods. The gripper assembly is reciprocated along a rectilinear path between a fuel rod gripping position at the exposed end of the fuel assembly and a remote fuel rod release position which is adjacent an entry end of a fuel rod directing chamber such as a transition funnel which has fuel rod receiving openings corresponding to the array of fuel rods in the fuel rod assembly. The operation of the reciprocating gripper serves to withdraw an increment of length of all the fuel rods in unison from the fuel assembly in one axial direction for entry and passage in the fuel rod directing chamber. The transition funnel at its fuel rod discharge end has a relatively narrow cross section which corresponds to the cross section of the desired compacted bundle of fuel rods presented to the storage container. For each individual fuel rod, there can be a separate guide within the transition funnel for directing a fuel rod from the fuel rod assembly through the transition funnel into a permanent storage container. The fuel rod consolidation process is thus carried out by positioning the transition funnel between the fuel rod assembly and a permanent storage container in a tandem arrangement so that the spent fuel rods pass in only one direction directly from the fuel rod assembly through the transition funnel into the storage container. This tandem arrangement of components can be provided in a hot cell or it can be provided beneath the water surface in a water pool. In the either event, the spent fuel rods move along a generally horizontal path or a generally vertical path. In the latter event, the fuel storage container can be located either above or below the transition funnel. Thus, the storage container can be positioned so that the spent fuel rods either move upwardly into the storage container or downwardly into the storage container. The passageways through the transition funnel direct the spent fuel rods into preestablished storage positions in a compacted array of fuel rods within the container.

A second gripper is arranged to reciprocate along a rectilinear path in a gap established between the discharge end of the transition funnel where the fuel rod bundle is gripped and the entry end of a storage canister where the fuel rod bundle is released. The second gripper can embody a construction for gripping the entire bundle of fuel rods since they are in a compacted array. The fuel rods are advanced into the storage container by reciprocating the second gripper in the same manner as the reciprocating motion of the first gripper. When the fuel rods are advanced in a generally horizontal plane from a fuel assembly through a transition funnel into a storage container as well as the aforesaid arrangement wherein the fuel rods are advanced upwardly from the fuel assembly through a funnel into a storage container, it is preferable and, in some instances, it may be desirable to provide additional retention means to support the fuel rods during the return movement of each of the first and second grippers. Such retention means can be located at the entry side of the transition funnel and/or storage container. The retention means may, when desired, include the use of conventional grids provided in the fuel assembly to support the fuel rods at various spaced-apart locations along the length of the fuel assembly. In this regard, such grids conventionally provide resilient spring clips to apply a spring tension force against the outer cylindrical surface of the fuel rod. The spring forces can be utilized to prevent unwanted axial movement of the fuel rods while the grippers are returned from a release position to a gripping position as described hereinbefore. When desired, a gripper at the entry and or exit end of the transition funnel can be attached to the funnel and the funnel with one or both grippers attached thereto can be reciprocated along a rectilinear path between gripping and release positions to move the fuel rods from the fuel rod assembly.

Preferably, the individual fuel rods are withdrawn concurrently from a fuel rod assembly so that the leading ends of all of the fuel rods enter into the container at about the same level to facilitate stacking within the container. Preferably, within the container, the array of spent fuel rods is a triangular array which provides maximum fuel rod density in the container. Preferably, the fuel rod density in the container is approximately twice that of the fuel rod density in the fuel rod assembly.

The transition funnel is so arranged that the guide tubes therein merge toward one another. As a consequence, the fuel rods, in passing from the fuel rod assembly into the fuel rod container, do not move apart so that critical distances between fuel rods cannot occur.

By providing fuel rod containers of the same cross-sectional dimensions as the fuel rod assemblies, the containers can be stored in the same underwater fuel rod storage racks which have been employed for the fuel rod assemblies. In addition, it is possible to transform the consolidated rods to other geometries, i.e., rhombic, to maximize storage in a cylindrical container which can be used for transporting and/or permanent storage at a local or remote storage site. When the present invention is practiced, the capacity of the fuel rod storage pools for spent nuclear fuel rods can be approximately doubled. The structural components of the empty fuel rod assembly are collected and stored for appropriate disposal.

Accordingly, it is an object of this invention to provide a method and apparatus for moving spent fuel rods from a fuel rod assembly directly into a fuel rod container for compact storage of the spent fuel rods.

It is a further object of this invention to carry out the described method and apparatus including reciprocating grippers that move a distance corresponding to only a small increment of the fuel rod lengths which minimizes the space required to consolidate the fuel rods while causing the fuel rods to move unidirectionally from a fuel rod assembly and into a storage container.

BRIEF DESCRIPTION OF THE DRAWINGS

These features and advantages of the present invention as well as others will be more fully understood when the following description is read in light of the accompanying drawings, in which:

FIG. 6 is an enlarged, partial plan view of a typical grid used to support fuel rods in a fuel assembly;

FIG. 7 is a sectional view taken along line 7—7 of FIG. 6;

FIG. 8 is a sectional view taken along line 8—8 of FIG. 6;

FIG. 9 is a plan view of one embodiment of a gripper for releasably engaging a spaced-apart array of fuel rods;

FIG. 10 is a sectional view taken along line 10—10 of FIG. 9;

FIG. 11 is a plan view, in section, of a second embodiment of a gripper for releasably engaging a spaced-apart array of fuel rods;

FIG. 12 is a sectional view taken along line 12—12 of FIG. 11;

FIG. 13 is a sectional view taken along line 13—13 of FIG. 11;

FIG. 14 is a plan view of a third embodiment of a gripper for releasably engaging a spaced-apart array of fuel rods;

FIG. 15 is a side elevational view taken along line 15—15 of FIG. 14;

FIG. 22 is an end elevation view illustrating the arrangement of storage containers in cylindrical vessels.

DESCRIPTION OF THE PREFERRED EMBODIMENTS

Figure 1:
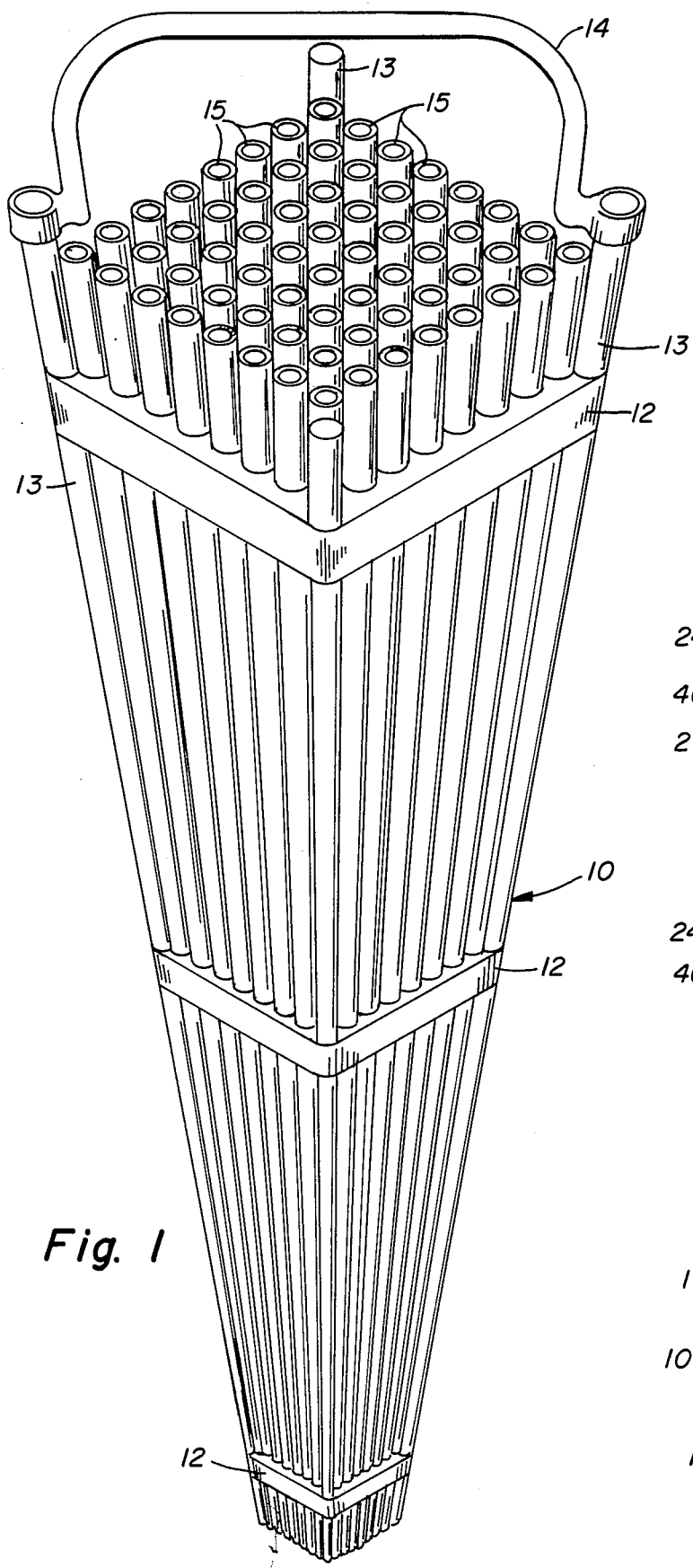
FIG. 1 is a perspective illustration of a typical fuel rod assembly.

Referring to FIG. 1, a typical fuel rod assembly 10 includes individual fuel rods 11 (64 rods are shown in FIG. 1), support grids 12, guide rods 13 and a handle member 14. The individual fuel rods 11 (sometimes also called fuel pins) are about 0.4–0.6 inch in diameter and about 8 feet long in one type of nuclear reactor installation and the fuel rods are about 15 feet long in another type of nuclear reactor installation. The support grids 12 are spaced apart at pre-established distances along the fuel rod assembly to position and support the fuel rods. The typical form of support grid will be described in greater detail hereinafter. The fuel rod assembly 10 is withdrawn from a nuclear reactor after the nuclear fuel within the fuel rods 11 has been spent. Thereafter, the fuel rod assembly 10 is stored in appropriate storage racks under water in storage pools until its activity is dissipated.

The purpose of the present invention is to compact the fuel rods 11 after their activity has dissipated and to store the fuel rods in a new and different container wherein the fuel rod spacing is altered. The fuel rods as presented in a fuel rod assembly for use in a nuclear reactor are intended to be active in the presence of slow neutrons. The fuel rods in operation are spaced apart by predetermined distances so that released neutrons can be slowed to an effective velocity for atomic reactions. Water is an effective moderator for this purpose. As the fuel rods are brought closer together, there is insufficient water between fuel rods to retard the velocity of the neutrons. Hence, the reactivity of the fuel rod assembly is reduced because the high velocity neutrons pass through the installation without sufficient retardation to cause any significant atomic collisions. Thus, the reactivity is reduced as the fuel rods are brought together.

Figure 2:
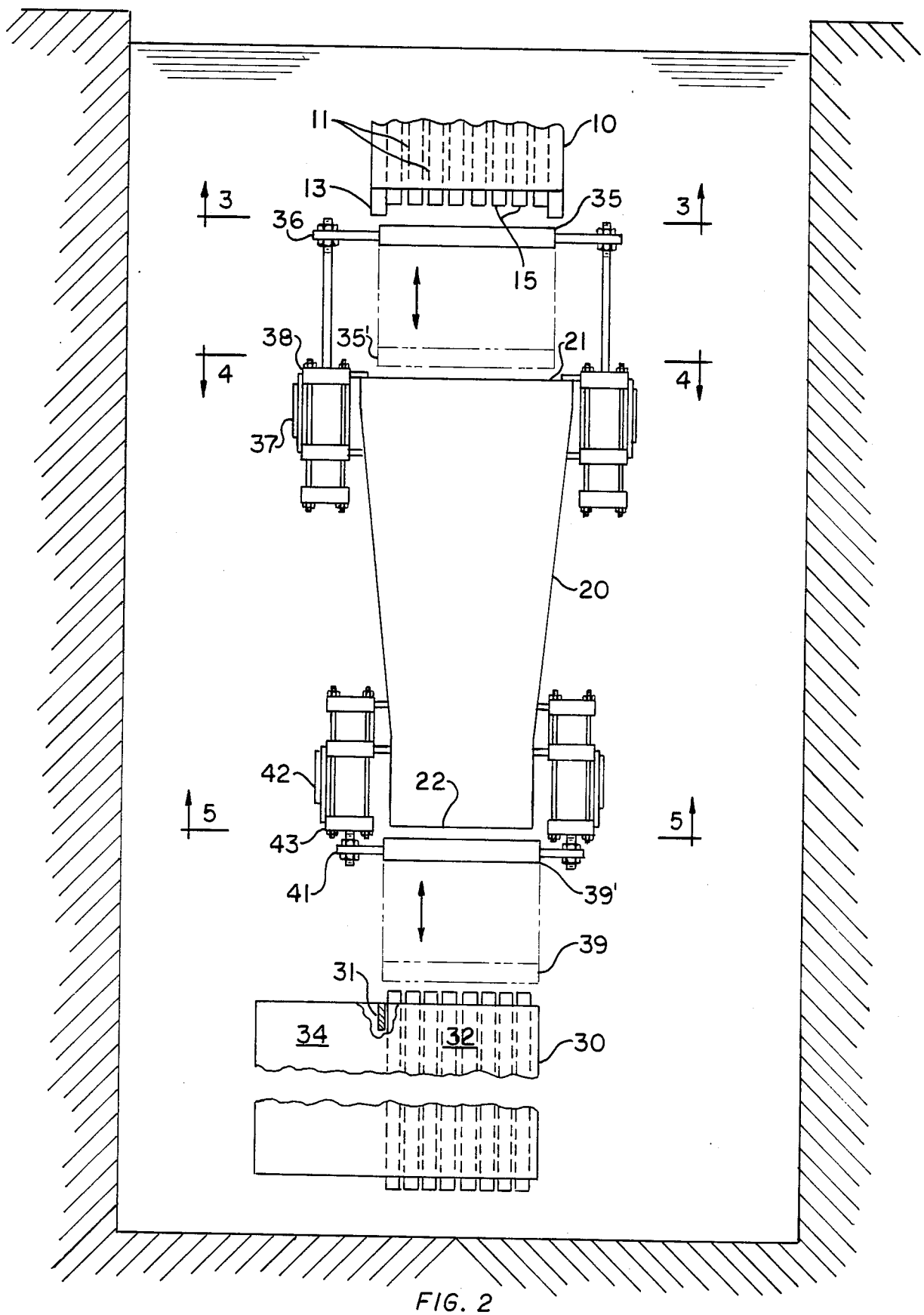
FIG. 2 is a broken, side elevational view of a fuel rod assembly, a transition funnel and a container illustrating the method and apparatus of the invention.

In the embodiment of the present invention shown in FIG. 2, the fuel rod assembly 10 is supported by a vertically-arranged structure which can be a so-called "strong back" beneath the water surface in a water pool. Beneath the fuel assembly in a spaced-apart tandem arrangement is a transition funnel 20 and therebelow a storage container 30. Initially, the fuel assembly 10 has its lower end removed so that the lower ends 15 of the individual fuel rods 11 are exposed. The lower end of the fuel assembly is removed by cutting or otherwise. One way of removing the lower end is to cut the lower end of the fuel assemblies with an air-powered underwater band saw. In some fuel rod assemblies, the lower end may be dismantled by removing the bolts or other fastening devices which connect it to the main frame. After the lower end of the assembly is removed, the lower ends 15 of the individual fuel rods 11 are exposed as shown in FIG. 2.

Figure 5:
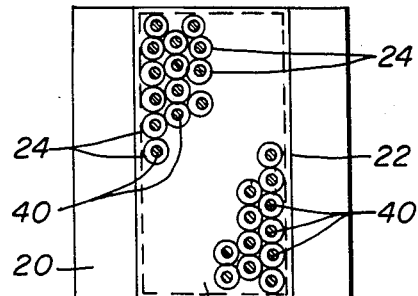
FIGS. 4 and 5 are plan views of the bottom end and top end, respectively, of the transition funnel of FIG. 2.
Figure 4:
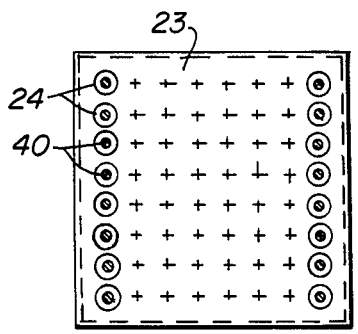
Figure 3:
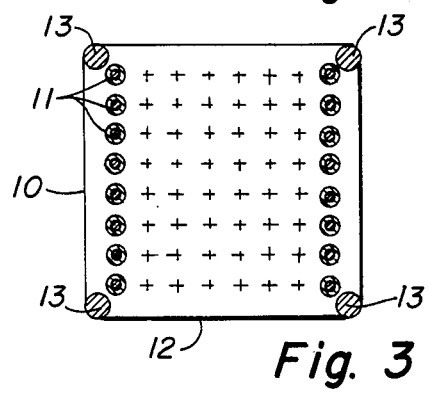
FIG. 3 is a cross-sectional view taken along line 3—3 of FIG. 2.

FIG. 3 illustrates the spaced-apart pattern of fuel rods forming a rectangular array of fuel rods within the fuel rod assembly. The transition funnel 20 has an upper end 21 and a lower end 22. The upper end 21 as shown in FIG. 4 has a generally square grid corresponding to the array of the fuel rods 11 as shown in FIG. 3. At the upper end 21 is a grid 23 having openings for individual tubes 24 corresponding in number and array with the exposed lower ends 15 of the fuel rods. The transition funnel tapers from its upper end 21 toward its lower end 22. At the lower end 22, the transition funnel 20 as shown in FIG. 5 has a grid 25 with openings for receiving the ends of the tubes 24 in a desired array. It will be observed that the array of the tube openings 24 in the grid 25 is an equilateral triangle—the preferred array.

Below the transition funnel 20 is the container 30 having outer dimensions corresponding to the outer dimensions of the fuel rod assembly 10. The container 30 preferably is a metal rectangular box having a length slightly greater than the length of the fuel rods 11 and having sufficient cross-sectional area to receive the compacted fuel rods from the fuel rod assembly 10 in approximately half of its cross-sectional area. In one embodiment, a vertical baffle is provided to divide the container 30 into parallel chambers 32, 34. All of the fuel rods 11 from the fuel rod assembly 10 can be confined in the chamber 32 as shown in FIG. 2. All of the fuel rods from another fuel rod assembly can be confined in the chamber 34.

In FIG. 2, there is schematically illustrated a spaced-apart relation between the tandem arrangement of the fuel assembly 10 and the transition funnel 20 as well as the transition funnel 20 and the container 30. According to the present invention, there is provided movable grippers which can reciprocate between gripping and releasing positions to advance fuel rods in a steplike manner from the fuel assembly. Typically, it is sufficient to reciprocate each of the grippers through a distance of 2 to 4 inches. In the space between the fuel assembly and the transition funnel, there is provided a gripper 35 which is supported and guided for reciprocating movement by the same support structure which supports the fuel assembly and the transition funnel. An arm 36 extends from the gripper and the rod end of a piston and cylinder assembly 37 is secured to the arm 36. The piston and cylinder assembly is supported by a bracket 38. It is preferred to provide the same arrangement of a piston and cylinder assembly at the opposite lateral side of the gripper 35. The piston and assembly 37 forms an actuator which displaces the gripper along a rectilinear path from the position shown in FIG. 2 to a position shown by phantom lines and identified by the reference numeral 35'. In a similar manner, there is provided a movable gripper 39 for gripping fuel rods at the discharge end of the transition funnel. The gripper is guided for rectilinear movement and supported by the same support structure which supports the container 30 and the transition funnel 20. Extending from one lateral side of the gripper 39 is an arm 41 to which the rod end of a piston and cylinder assembly 42 is secured. The piston and cylinder assembly is, in turn, supported by a bracket 43 extending from the support structure. The gripper 39 is reciprocated from the position shown in FIG. 2 by the piston and cylinder assembly 42 to a position shown by phantom lines and identified by the reference numeral 39'. During the time while the fuel rods are advanced downwardly from the fuel assembly 10 by the gripper 35, means are utilized to avoid unrestrained displacement of the fuel rods in the direction of their length.

In the embodiment of the present invention shown in FIG. 2, the means utilized for this purpose comprises the fuel assembly support grids 12 which are illustrated in greater detail in FIGS. 6–8. In this regard, the fuel rods need only be restrained against uncontrolled axial movement during displacement of the leading ends of the fuel rod from the position in which they reside when the lower end of the fuel assembly is removed until the array of fuel rods enters the upper end 21 of the transition funnel. Thereafter, movement of the fuel rods is constrained due frictional resistance in the transition funnel to repositioning of the fuel rods from a spaced-apart, rectangular array to a triangular array as described hereinbefore and shown in FIGS. 4 and 5, respectively. A typical support grid 12 is shown in FIGS. 6–8 and takes the form of spaced-apart, parallel plates 45 between which there is welded or otherwise secured spaced-apart, parallel plate sections 46 which form a square-shaped array of openings into which, inter alia, the fuel rods pass.

As best shown in FIGS. 7 and 8, the plates 45 and plate sections 46 each has a central web section 47 formed by punching or otherwise upsetting the metal along a major face area of the plates 45 and plate sections 46. At opposite ends of the web section 47, there are smaller dimensioned upset web sections 48. Sections 47 and 48 protrude into the open spaces of the array for frictional engagement with the outer face surfaces of the fuel rods. The resistance against axial movement by the fuel rod assembly afforded by frictional engagement with the sections 47 and 48 is sufficient to prevent random and uncontrolled movement of one or more fuel rods. Even if, however, a fuel rod breaks loose from supporting engagement with the support grids, the moving fuel rod will merely enter the transition funnel where the required path of movement to undergo the consolidation process exerts sufficient frictional force on the rod to prevent substantial advancement of the rod through the transition funnel. The inhibition against axial movement provided by the support grids assures an orderly movement of the entire array of fuel rods from the fuel assembly into the transition funnel while at the same time, the arrangement of parts is such that the fuel rods of the array cannot separate from one another by distances greater than the spacing between the fuel rods in the fuel assembly.

The gripper 35 may embody a construction of parts shown in FIGS. 9 and 10 wherein the gripper includes spaced-apart plates 51 and 52 interconnected by spacer plates 53 which are arranged to extend about outer peripheral portions of the plates 51 and 52. The interconnection between these plates forms a fluid impervious internal pocket 54 which can be pressurized by a fluid medium introduced by a conduit 55 into the pocket through an opening in one of the spacer plates 53. The fluid medium is delivered from a pump through an adjustable control valve 55A which can be adjusted to vary the fluid pressure delivered to conduit 55. Extending through the internal pocket 54 and adhered to aligned openings in the plates 51 and 52 is an array of elastic tubes 56 each of which has an internal diameter closely approximating the outside diameter of a fuel rod. Preferably, the diameter of each tube 56 is such that a fuel rod can pass freely. The array of tubes 56 corresponds to the array of fuel rods in the fuel assembly as typically illustrated in FIG. 3 and described hereinbefore. The tubes 56 each comprises material such as rubber which has sufficient resiliency so that when a fluid medium in chamber 54 is pressurized, the wall of the tubes in the chamber can be elastically deformed and pressed into frictional engagement with the outer surface of the fuel rods. The gripping force which can be applied to the fuel rods in this manner is adjustably controlled by valve 55A so that the gripping force is sufficient to hold the fuel rods as a group for movement with the gripper along a rectilinear path which is parallel to the longitudinal axes of the fuel rods. As described previously, the gripper is displaced by piston and cylinder assembly 37 for this purpose. When the gripper is moved to the position identified by reference numeral 35', the pressure of the fluid medium in chamber 54 is reduced by operation of the control valve 55A so that the fuel rods are no longer gripped by the tubes. Thereafter, the piston and cylinder assembly 37 is operated to return the gripper to a starting position during which the tubes 56 slide along a relatively short incremental length of the fuel rods. When the gripper is returned to a start position which is adjacent the fuel assembly, valve 55A is again operated so that the fluid medium in chamber 54 is pressurized to again grip the fuel rods for displacement of a further increment of length in a direction toward the transition funnel. The reciprocatory motion of the gripper pulls the fuel rods from the fuel assembly and introduce the leading ends into the passageways in the transition funnel. The leading ends of the fuel rods are advanced through and emerge from the funnel by operation of the gripper. The emerging fuel rods have a bundle configuration as shown in FIG. 5. The length of the paths of travel by the fuel rods through the funnel is relatively short as compared to the length of the fuel rods so that the fuel rod bundle emerging from the funnel can be continually advanced by the gripper to the point where they protrude from end 22 of the funnel by a sufficient distance so that the fuel rod bundle can be engaged collectively by gripper 39.

Figure 16:
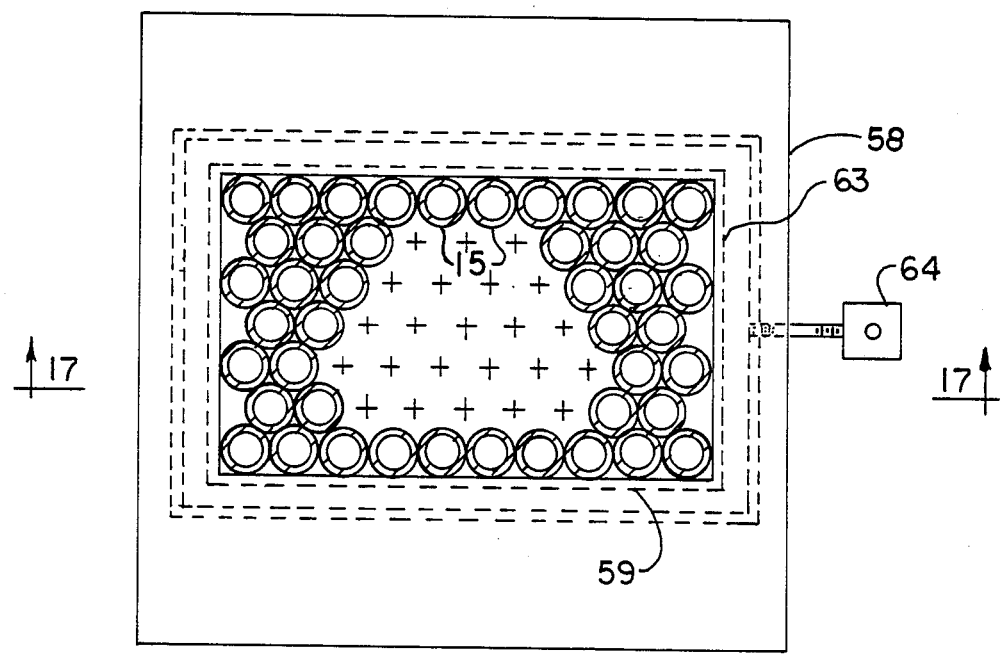
FIG. 16 is a plan view of a first embodiment of a gripper for releasably engaging a compacted array of fuel rods.
Figure 17:
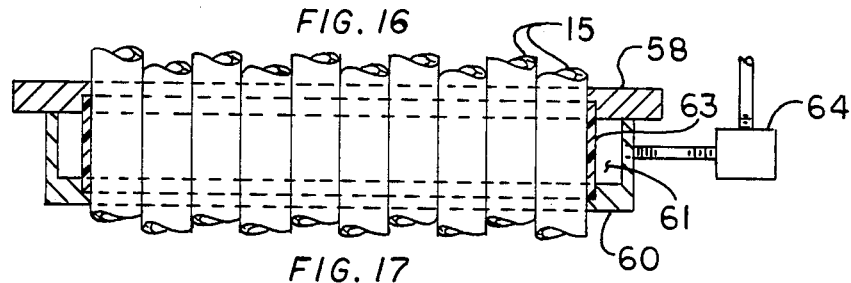
FIG. 17 is a sectional view taken along line 17—17 of FIG. 16.

An embodiment of gripper 39 is shown in FIGS. 16 and 17 and includes a plate member 57 having a rectangular opening therein which is dimensioned so as to receive within the opening the compacted array of fuel rods when emerging from the end 22 of the transition funnel. The opening is identified by reference numeral 59. Surrounding the opening at one side of plate 58 is a manifold 60 having a peripheral recess 61 communicating with a conduit 62. The manifold 60 is secured to plate 58 in a fluid-tight manner and spanning a recess forming chamber 61 is a resilient membrane 63. Typically, the membrane is comprised of a strip of elastomeric material such as rubber which is adhered as by vulcanizing to the manifold 60 and plate 58. A fluid medium introduced by conduit 62 into chamber 61 is pressurized by a pump, not shown, and adjustably controlled by a valve 64 so that the membrane is pressed into gripping engagement with those fuel rods which are situated about the outer periphery of the bundle of fuel rods in the opening 59. The fuel rods are in contact with one another in the triangular array as typically illustrated in FIG. 5 and described hereinbefore. After the fuel rods are gripped in this manner, piston and cylinder assembly 42 is actuated to displace the gripper 39 along a rectilinear path which is generally parallel to the longitudinal axis of the fuel rods. The bundle of fuel rods is advanced from the transition funnel in a direction toward the container 30 as shown in FIG. 2 until the gripper reaches the position identified by reference numeral 39'. At this point, valve 64 is operated so that the pressure of the fluidized medium in chamber 61 is reduced to such an extent that the bundle of fuel rods is no longer gripped and the gripper can be returned to a start position by operation of piston and cylinder assembly 42. After this occurs, the gripper is again supplied with a pressurized fluid medium so that the fuel rod bundle is again gripped whereupon the gripper is again advanced toward the container to displace the fuel rod bundle from the transition funnel. The bundle of fuel rods is drawn from the funnel and passed into the container through operation of the gripper 39 until the lengths of the fuel rods have undergone consolidation in the funnel. As the trailing end of the fuel rod bundle emerges from the funnel the gripper 39 operates to push a final length of the bundle in the container.

A further embodiment of the gripper 35 is illustrated in FIGS. 11–13. In this embodiment, a frame having a rectangular configuration, is comprised of side rails 65 and 66 and end rails 67 and 68. Spanning the distance between side rails 65 and 66 is an alternating arrangement of spaced-apart active and passive grippers 69 and 70, respectively. The space between the grippers is sufficient so that the fuel rods can pass in the direction of their length when the active grippers are deenergized. The active and passive grippers preferably each includes arcuate recesses 71 and 72, respectively, at spaced-apart locations along the length of each gripper corresponding to the spacing between rows of fuel rods in the array. The arcuate recesses provide an increased gripping area for engagement with the fuel rods. In the form of the gripper shown in FIGS. 11–13, the passive gripper elements each comprise a rectangular bar which is welded or otherwise secured to the side rails. The active grippers 79 each comprise a tube 69 preferably comprised of metal such as stainless steel. The ends of each tube 69 have a cylindrical configuration which extends to transition sections 72. Between the transition sections, the gripper has an oval configuration which can be produced by a partial flattening of a tube into the oval configuration as shown in FIG. 13. A passageway 74 extends along the interior of side rails 66 and communicates with an end portion of each active gripper. A conduit 75 is connected to a suitable supply of a pressurized fluid medium for delivery to the interior of each active gripper. The pressure of the fluid medium is sufficient to produce a bulging of the elliptical configuration of the tube in the direction of the minor axis of the ellipse which forces the corresponding segment of the wall of the tube against fuel rods in the gap at either side thereof formed with a passive gripper.

The gripper 35 may embody a further construction shown in FIGS. 14 and 15 in which fuel rods in the array are received in spaces between spaced-apart and parallel gripper elements 76. Opposite ends of the gripper elements are provided with arbors 77 and 78 which are rotatably supported in annular openings provided in side rails 79 and 80. The openings in side rails 79 extend partway through the thickness of the side rail; whereas the openings in side rail 30 extend through the entire thickness of the rail so that end portions comprise trunnions protruding from the side rail. Secured to each trunnion is one end of links 81. The free ends of links 81 are connected by a shaft to an actuator bar 82. An actuator, such as a piston and cylinder assembly, is operably connected to an extended end portion of one of the links which is identified by reference numeral 81A. The motion imparted by the actuator to link 81A moves the link in a direction to displace the actuator bar 82 and thereby rotate each of the grippers 76 about their longitudinal axes in the same direction so that edges of the grippers due to their rectangular cross-sectional configuration are brought into engagement with the side walls of the fuel rods. Operation of the actuator in the opposite direction brings about rotation of the grippers to the position which is shown in FIG. 15 where a gap exists between the fuel rods and the gripper so that the gripper can be moved relative to the fuel rods.

Figure 18:
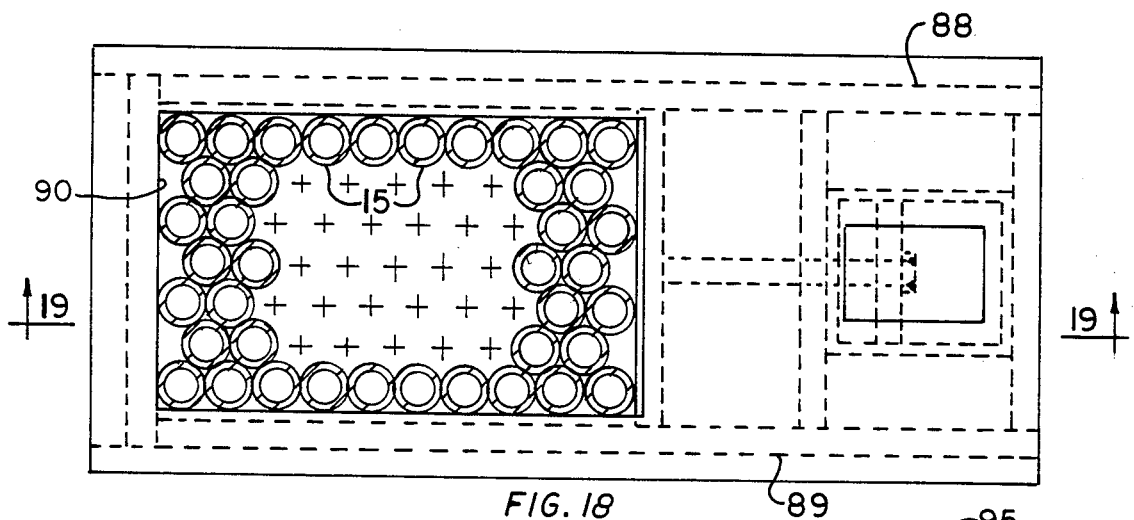
FIG. 18 is a plan view of a second embodiment of a gripper for releasably engaging a compacted array of fuel rods.
Figure 19:
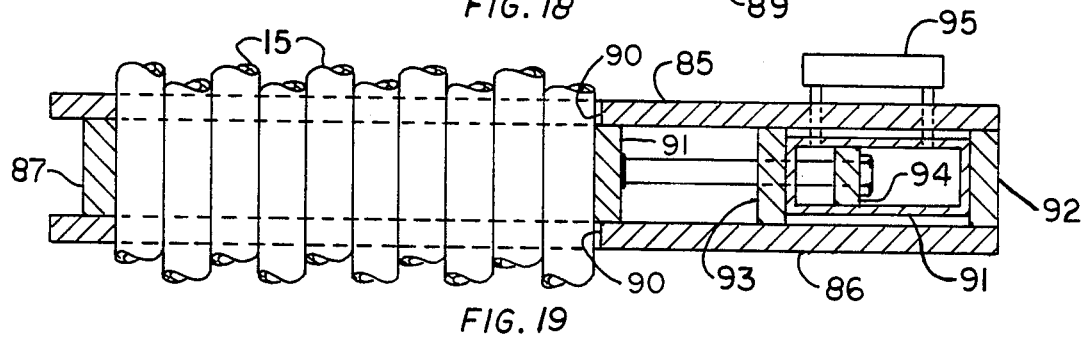
FIG. 19 is a sectional view taken along line 19—19 of FIG. 18.

The gripper 39 used to move the bundle of fuel rods may embody a construction shown in FIGS. 18 and 19 in which spaced-apart plates 85 and 86 are joined together by spacer plates 87, 88 and 89. Plates 85 and 86 each includes a rectangular opening 90 which is dimensioned to correspond to the compacted array of fuel rods emerging from the end 22 of transition funnel 20. Plates 88 and 89 extend in a generally parallel relation and arranged therebetween is a gripper plate 91 which can be forced into compressive engagement with the bundle of fuel rods by operation of a piston and cylinder assembly 92 that is supported in a cavity formed between anchor plates 93. As shown in FIG. 19, chambers within the piston and cylinder assembly 94 at opposite sides of the piston 94A are connected by conduits to a valve 95 to adjustably control the flow of pressurized fluid to the piston and cylinder assembly so that the gripper plate 91 can be pressed into engagement with a bundle of fuel rods to insure gripping of the fuel rod bundle.

Figure 20:
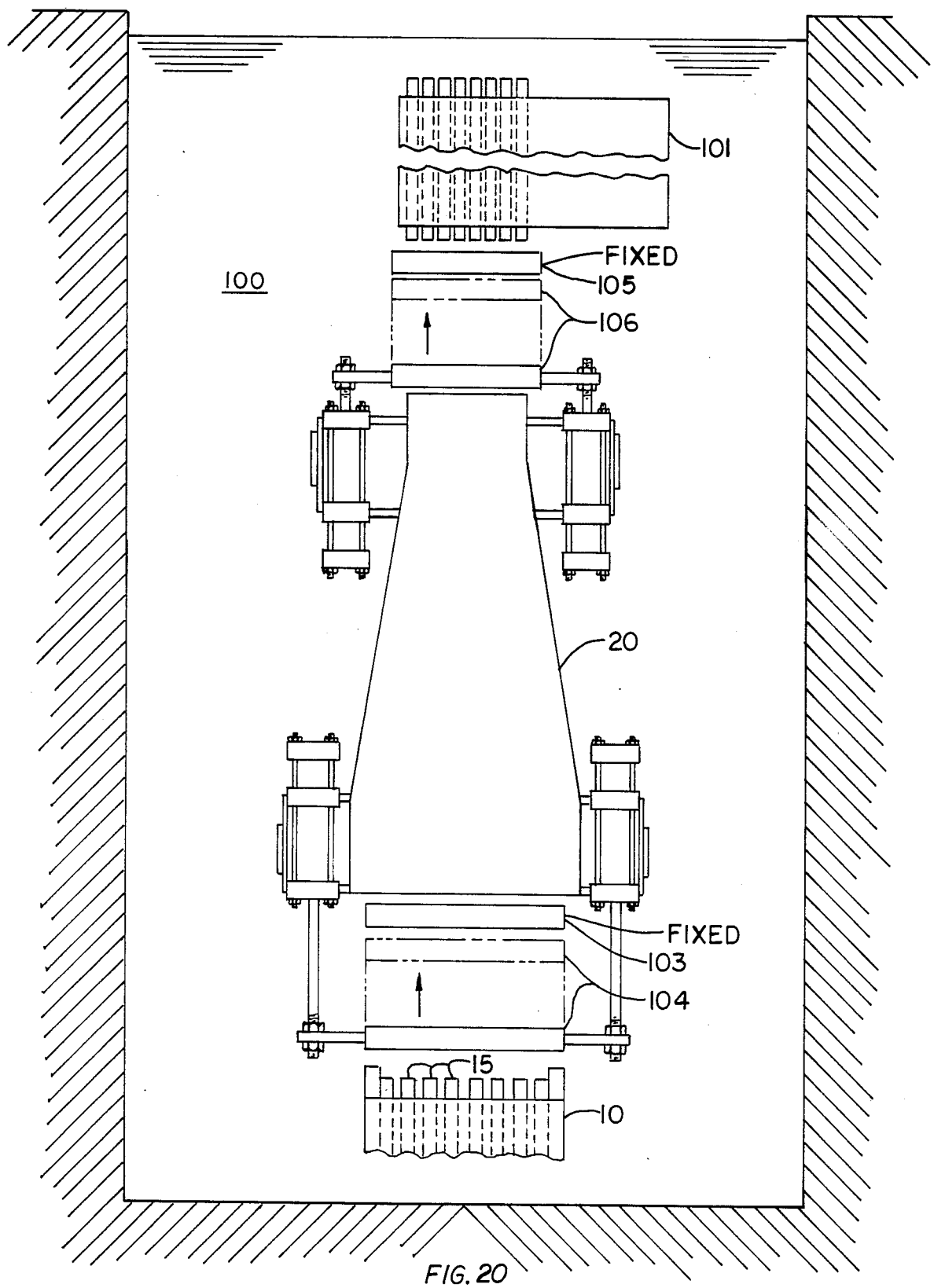
FIG. 20 is a view similar to FIG. 2 and illustrating an arrangement of fuel rod assemblies, a transition funnel and a container disposed for upward vertical movement of fuel rods.

In FIG. 20, there is illustrated a further arrangement of apparatus to carry out the method of the present invention. Spaced below the surface of water identified by reference numeral 100 in a water pool there is tandemly arranged a canister 101 and therebelow in a spaced-apart relation is the discharge end 22 of the transition funnel 20. The upper end of the fuel assembly 10 is located below the entry end of the transition funnel. In the space between the transition funnel and the fuel assembly, there is arranged two grippers 103 and 104. Gripper 103 is supported in a stationary manner by the structure, e.g., a strong back, which also supports the fuel assembly, transition funnel and canister. Gripper 104 is supported by the structure to reciprocate in the space between the fixed gripper 103 and the fuel rod assembly. In the space between the canister 101 and the transition funnel 20, there is arranged two bundle grippers 105 and 106. Gripper 105 is supported in a stationary manner by the strong back and gripper 106 is supported by this structure to reciprocate in the space between the fixed gripper 105 and the transition funnel 20. Each of the grippers 103 and 104 may embody a construction according to any one of the embodiments described hereinbefore with respect to gripper 35 and each of the grippers 105 and 106 may be constructed according to any one of the embodiments described hereinbefore for gripper 39.

Figure 21:
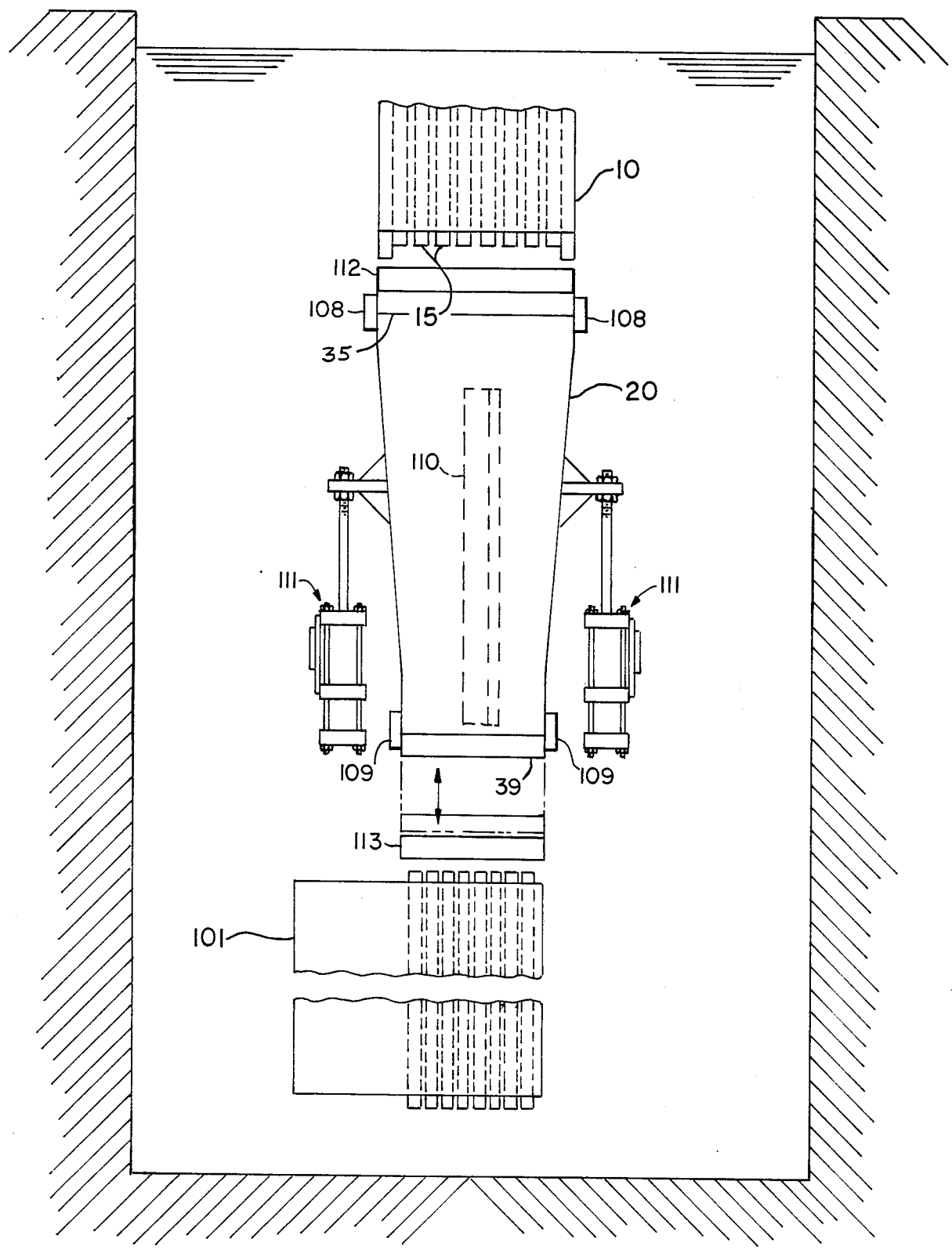
FIG. 21 is a view similar to FIG. 20 and illustrating an arrangement wherein grippers are reciprocated with a transition funnel.
Figure 1:
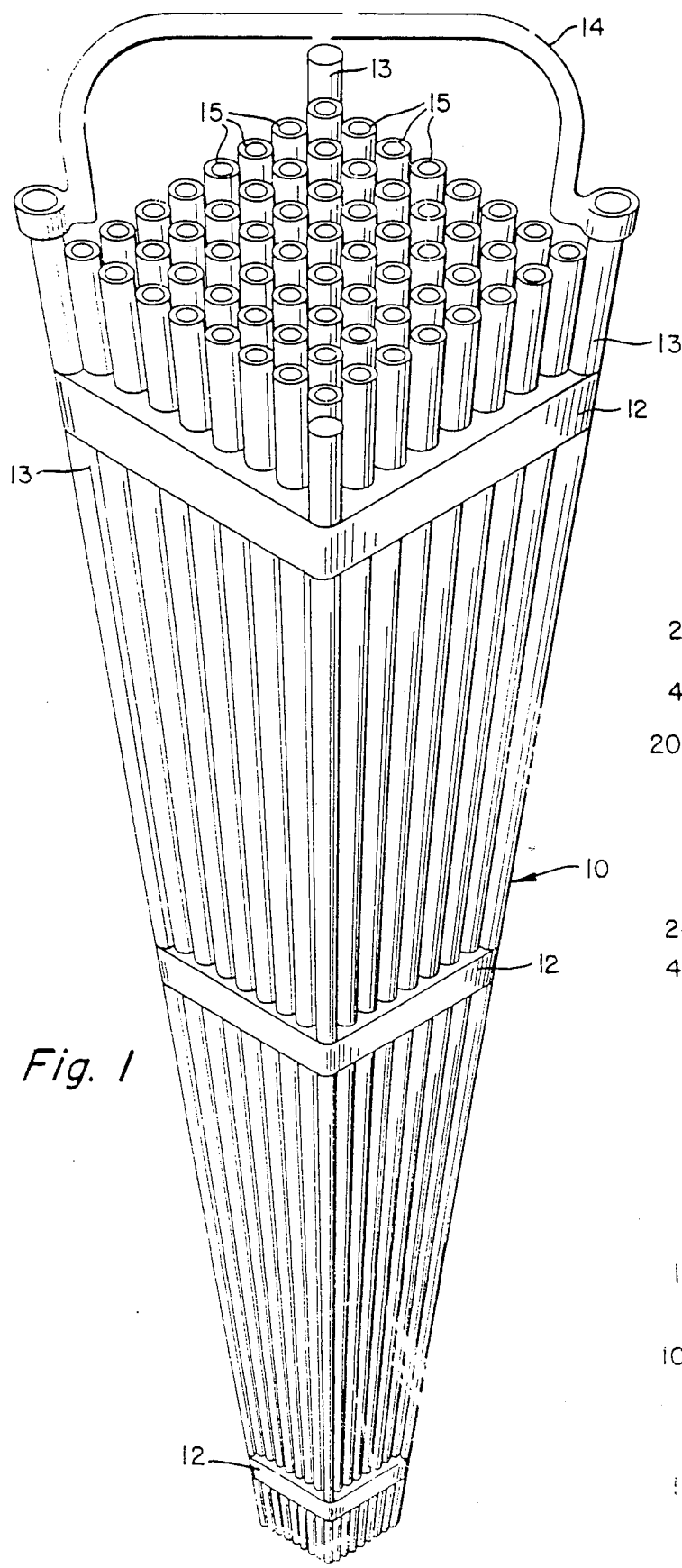
Figure 5:
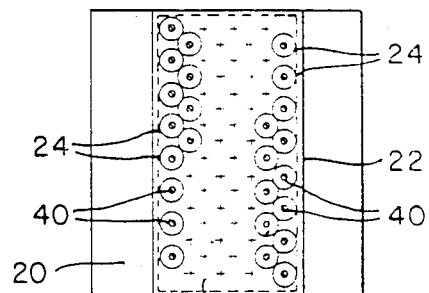
Figure 4:
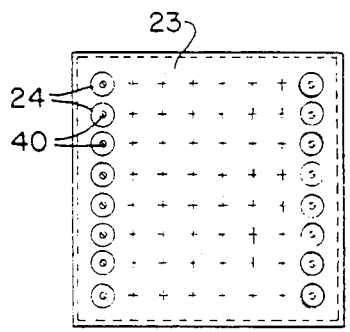
Figure 3:
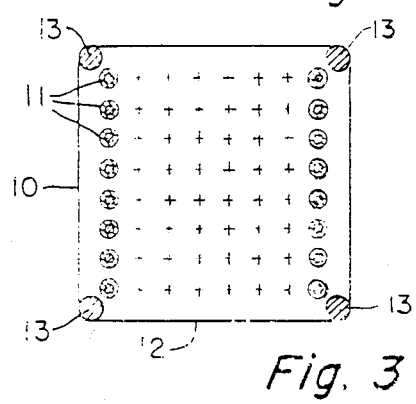

A further embodiment of the present invention is shown in FIG. 21 which essentially differs from the embodiments hereinbefore described by the fact that grippers 35 and 39 are secured by brackets 108 and 109, respectively, to the transition funnel 20. The funnel is in turn provided with a support bracket 110 which extends to a support structure such as a strong back on which there is provided an elongated guide to slideably support the funnel for rectilinear reciprocating movement. A piston and cylinder assembly 111 is supported by the strong back so that the rod end of the piston and cylinder assembly is connected to a bracket or other structure extending from the funnel. By this arrangement of parts, the grippers at opposite ends of the funnel reciprocate between a rod gripping position and a rod release position. During return movement of the grippers and funnel, the fuel rods are supported against unwanted axial movement by support grids 12 and/or stationary grippers. The use of stationary grippers for this purpose is preferred and these grippers are identified by reference numerals 112 and 113. The stationary grippers like grippers 35 and 39 may embody a construction of parts according to any one of the embodiments hereinbefore described.

As described hereinbefore, it is preferred to utilize the fuel rod compacting method and apparatus of the present invention to transfer fuel rods from two fuel assemblies into a single canister which can be placed in a storage rack for long-term storage. The present invention is not limited thereto and can be utilized to transfer, for example, all the fuel rods from a fuel assembly into a single container having a square, rectangular, or other geometry to permit transportation or permanent storage at a local or remote storage site. In this regard, the triangular configuration of the array of fuel rods in the compacted bundle emerging from the transition funnel can be conveniently placed in a container having a rhombic cross-sectional configuration. In FIG. 22, three storage containers 115, 116, and 117 are illustrated each having a rhombic configuration for receiving a bundle of fuel rods. The rhombic configuration of the storage containers is particularly suitable for placement in a container having a cylindrical cross-sectional configuration. The cylindrical container is identified by reference numeral 118 and can be used for transporting fuel rods to a remote storage site for permanent storage of the fuel rods.

The spaced-apart tandem relationship between a fuel assembly, transition funnel and canister can, when desired, be provided in a hot cell wherein the components are arranged so that the fuel rods preferably move unidirectionally along a generally horizontal path. However, if the hot cell embodies a size sufficient to accommodate a vertical arrangement of components so that the fuel rods move unidirectionally along a vertical path, then the fuel consolidating procedure can be carried out by movement of the fuel rods along a path of travel which can be either upwardly or downwardly from the fuel assembly through the consolidating funnel and into the storage canister.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A nuclear fuel handling system including a storage container, a fuel assembly having an array of nuclear fuel rods, and a gripper apparatus to move the array of fuel rods between the fuel assembly and the storage container, said gripper apparatus including the combination of gripper means supported by a frame to releasably engage at least diametrically opposite sides of fuel rods of said array,
    means for pressing said gripper means into engagement with said fuel rods, and
    reciprocative means to move said gripper means between spaced-apart gripping and release positions for advancing said spent fuel rods an increment of length thereof in one axial direction relative to said storage container.

2. The nuclear fuel handling system according to claim 1 wherein said gripper means includes an array of spaced-apart resilient tubes corresponding to an array of spaced-apart spent fuel rods in a fuel assembly, said frame including support means engaging opposite ends of said resilient tubes for forming an enclosed chamber, and wherein said means for pressing includes a conduit for delivering a pressurized fluid medium to said enclosed chamber for elastically deforming with said fuel rods.

3. The nuclear fuel handling system according to claim 1 wherein said gripper means includes spaced-apart and elongated gripper elements for receiving said fuel rods in the space between the gripper elements.

4. The nuclear fuel handling system according to claim 3 wherein at least some of said gripper elements include an elastically-deformable length which can be displaced in the space between the gripper elements.

5. The nuclear fuel handling system according to claim 3 wherein said gripper elements comprise an active gripper at each of opposite sides of passive grippers, the active grippers having an elastically-deformable section which can be displaced toward a passive gripper for gripping fuel rods passed therebetween.

6. The nuclear fuel handling system according to claim 5 wherein said means for pressing includes an internal passageway in said frame communicating with an internal passageway in each of the active grippers for delivery of a pressurized liquid medium.

7. The nuclear fuel handling system according to claim 1 wherein said gripper means includes spaced-apart and parallel gripper rods having trunnions extending from said frame and connected to an actuator rod.

8. The nuclear fuel handling system according to claim 1 wherein said gripper means includes a resilient member supported by said frame for encircling the outer periphery of a bundle of fuel rods, said means for pressing including a conduit for delivering pressurized fluid to a cavity between said resilient member and said frame for elastically deforming the resilient member into engagement with the fuel rod bundle.

9. The nuclear fuel handling system according to claim 1 wherein said gripper means includes a gripper plate supported by said frame to form a fuel rod bundle receiving opening, said means for pressing including an activator for moving said gripper plate into engagement with a bundle of fuel rods when received in said fuel rod bundle receiving opening.

10. A nuclear fuel handling system including the combination of a storage container, a consolidation chamber having fuel rod entry and delivery openings at opposite ends thereof, a fuel assembly including an array of spaced apart spent fuel rods, and a gripper apparatus to move spent fuel rods in said consilidation chamber for displacement between the fuel assembly and the storage container, said gripper apparatus including the combination of spaced apart gripper means supported by a frame to releasably engage spent fuel rods of said array, and
    reciprocative means to move said gripper means between spaced-apart gripping and release positions at one end of said consolidation chamber for advancing said spent fuel rods an increment of length thereof in one axial direction relative to the consolidation chamber.

11. The nuclear fuel handling system according to claim 10 wherein said gripper means includes an array of spaced-apart resilient tubes corresponding to said array of spaced-apart spent fuel rods, said frame including support means at opposite ends of said resilient tubes for forming an enclosed chamber, and means including a conduit for delivering a pressurized fluid medium to said enclosed chamber for elastically pressing said resilient tubes against said fuel rods to thereby grip the fuel rods.

12. The nuclear fuel handling system according to claim 10 wherein said gripper means includes spaced-apart and elongated gripper elements for receiving fuel rods of said array in the space between the gripper elements.

13. The nuclear fuel handling system according to claim 12 wherein at least some of said gripper elements include an elastically-deformable section in the space between the gripper elements.

14. The nuclear fuel handling system according to claim 12 wherein said gripper elements comprise an active gripper at each of opposite sides of passive grippers, the active grippers having an elastically-deformable section which can be displaced toward a passive gripper for gripping fuel rods passed therebetween.

15. The nuclear fuel handling system according to claim 14 wherein said active gripper includes an internal passageway for receiving a pressurized liquid medium.

16. The nuclear fuel handling system according to claim 10 wherein said gripper means includes spaced-apart and parallel gripper bars having trunnions extending from said frame and connected to an actuator rod.

17. The nuclear fuel handling system according to claim 10 wherein said gripper means includes a resilient member supported by said frame for encircling the outer periphery of a bundle of fuel rods, a conduit for delivering pressurized fluid to a cavity between said resilient member and said frame for elastically deforming the resilient member into engagement with the fuel rod bundle.

18. The nuclear fuel handling system according to claim 10 wherein said gripper means includes a gripper plate supported by said frame to form a fuel rod bundle receiving opening, and means for pressing including an activator for moving said gripper plate into engagement with a bundle of fuel rods when received in said fuel rod bundle receiving opening.

* * * * *